United States Patent
Kaiser et al.

[11] Patent Number: 5,857,811
[45] Date of Patent: Jan. 12, 1999

[54] CONNECTION BETWEEN A CUTTER HOLDER AND A TOOL CARRIER OF AN INTERNAL-TURNING HEAD

[75] Inventors: Heinz Kaiser, Wallisellen; Dieter Pape, Rülang; Hans Woerz, Oberhasli, all of Switzerland

[73] Assignee: Heinz Kaiser AG, Rumlang, Switzerland

[21] Appl. No.: 804,200

[22] Filed: Feb. 21, 1997

[30] Foreign Application Priority Data

Feb. 22, 1996 [CH] Switzerland ............... 455/96

[51] Int. Cl.⁶ .................................. B23B 29/04
[52] U.S. Cl. ................. 407/101; 407/88; 408/153; 408/181; 408/185; 408/231; 408/233
[58] Field of Search ................ 407/77, 88, 97, 407/101; 408/181, 185, 153, 231, 233

[56] References Cited

U.S. PATENT DOCUMENTS 4,784,536  11/1988  Pfalzgraf .................. 408/181
5,396,693  3/1995  Lohner ..................... 408/153

FOREIGN PATENT DOCUMENTS

| 0 249 892    | 12/1987 | European Pat. Off. . |
| 0 478 239 A1 | 4/1992  | European Pat. Off. . |
| 35 08 434 A1 | 9/1985  | Germany . |
| 641 706 A5   | 3/1984  | Switzerland . |
| WO 91/02614  | 3/1991  | WIPO . |

*Primary Examiner*—Andrea L. Pitts
*Assistant Examiner*—Toan Le
*Attorney, Agent, or Firm*—Weiser and Associates, P.C.

[57] ABSTRACT

For the purpose of rigid connection of the cutter holder (9) to the tool carrier (5), the tool carrier (5) has a driving key (11) on its end side, which driving key is inserted into a corresponding transverse groove (13). The driving key (11) has a specified excess size compared to the transverse groove (13), such that when a setscrew (10) is tightened the tool carrier (5) and the cutter holder (9) are elastically deformed. Laterally next to the transverse groove (13) the surface of the cutter holder (9) is supported on the tool carrier (5).

8 Claims, 1 Drawing Sheet

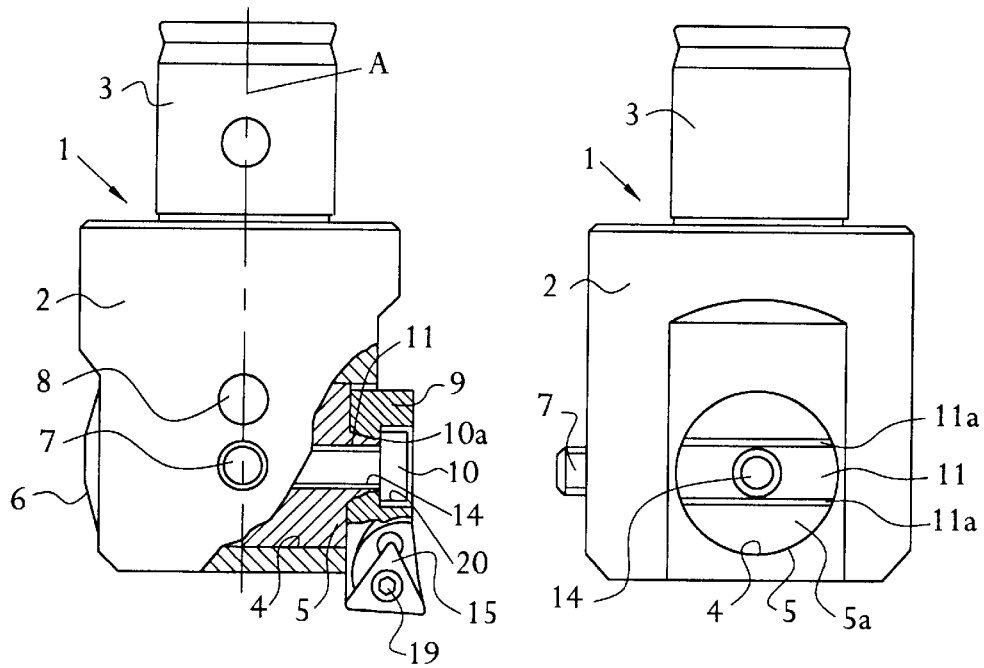
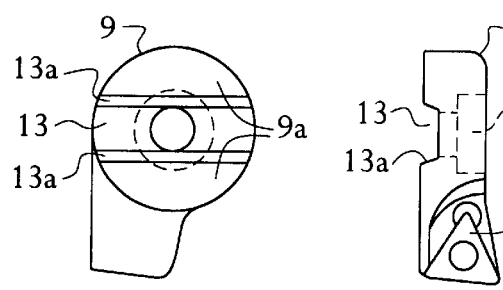
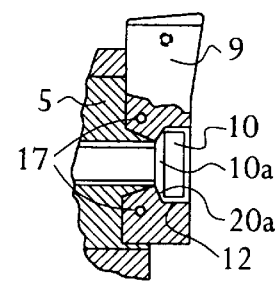
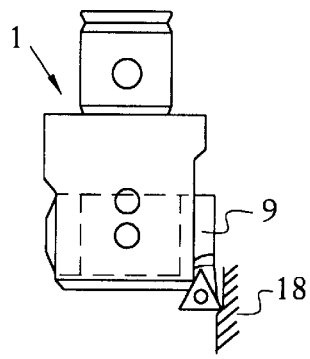
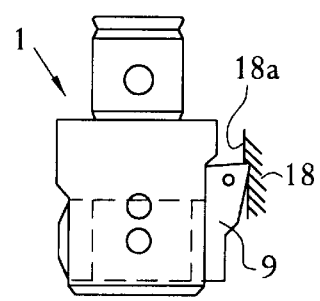
FIG. 1  FIG. 2
FIG. 3  FIG. 4  FIG. 5
FIG. 6  FIG. 7

CONNECTION BETWEEN A CUTTER HOLDER AND A TOOL CARRIER OF AN INTERNAL-TURNING HEAD

BACKGROUND OF THE INVENTION

1. Field of the Invention

The invention relates to a connection between a cutter holder and a tool carrier of an internal-turning head with a fine-adjustment mechanism, having a setscrew for releasably connecting the cutter holder to the tool carrier.

2. Description of the Related Art

A connection of this kind is known from Swiss Patent No. CH-A-641,706. In this case, the cutter holder is inserted into a recess in the tool carrier, which recess runs obliquely to the adjustment direction of the tool carrier and is fixed by a screw. Similar connections have been disclosed in the prior art by European Patent No. EP-A-0,478,239 and by German Patent No. DE-A-35 08 434. Moreover, an internal-turning head is known in which the tool carrier and the cutter holder are connected to one another by means of a serration as an anti-rotation safeguard. Moreover, an internal-turning head is known in which the tool carrier has an end face which runs obliquely to the adjustment direction of the tool carrier and against which the cutter holder, which is provided with a correspondingly oblique face, is pressed by means of a setscrew.

The abovementioned known internal-turning heads in each case have a main body in which the tool carrier is radially displaceable for the purpose of setting the diameter of the bore to be machined. The displacement is effected via an adjustment screw which is mounted in the main body and has a fine thread. The cutter holder, on which a cutting tip, for example a throw-away cutting tip made of sintered carbide, is releasably mounted, is arranged on the tool carrier. Worn cutters or a damaged cutter holder can easily be replaced. The practical requirements for the connection between the cutter holder and the tool carrier are that it should be reliable, as rigid as possible, secure against rotation and able to be positioned unambiguously. Moreover, the cutter holder should be simple to replace. The known connections satisfy these requirements only partially or unsatisfactorily. This is particularly true when considered in conjunction with the trend towards very hard and heat-resistant cutting materials leading to ever higher metal-removal rates. This trend is increasingly leading to higher cutting speeds. Since the internal-turning head forms the linking element between the cutter and the work spindle of a machine tool, the performance of the machine tool must be transmitted optimally to the cutter. The connection of the cutter holder to the tool carrier is decisive in achieving a satisfactory machining result.

SUMMARY OF THE INVENTION

The invention is based on the object of providing a connection of the generic type mentioned which better satisfies the abovementioned practical requirements. In particular, the connection according to the invention should be sufficiently rigid for high metal-removal rates. Moreover, it is to be possible to arrange the cutter holder offset by 180°, thus permitting relieving turning of a precision bore using a standard tool.

The object is solved in a connection in accordance with the generic type in that the cutter holder has a conical transverse groove and the tool carrier has a corresponding driving key on its end side, and the driving key has a specified excess size compared to the transverse groove, such that the tool carrier and the cutter holder undergo an elastic deformation when the setscrew is tightened and such that the surfaces of the tool carrier and the cutter holder bear flat against one another laterally next to the transverse groove and the driving key. In the connection according to the invention, it is possible to achieve a protection against rotation which is comparable to a serration while, however, avoiding the high production accuracy required in the case of a serration and possible indexing errors. In the connection according to the invention, the cutter holder is placed on the end side of the tool carrier. Displacements or vibrations are avoided, even with high cutting forces, by means of the elastic interaction of the transverse groove with the driving key in combination with the flat bearing of the cutter holder on the tool carrier. The elastic deformations which the tool carrier and the cutter holder undergo when the setscrew is tightened may be comparatively minor.

In order to achieve greater elastic deformability in the region of the conical transverse groove, it is possible in accordance with a refinement of the invention to provide a plurality of load-relieving grooves. Moreover, such load-relieving grooves make it possible to increase manufacturing tolerances and thus to simplify production further. The positioning of the cutter holder on the tool carrier may be made yet more precise by means of a conical design of the head of the setscrew and a corresponding counterboring in the cutter holder. In every case, it is possible to arrange the cutter holder on the tool carrier offset by 180°.

BRIEF DESCRIPTION OF THE DRAWINGS

Further advantageous features will emerge from the dependent patent claims, the following description and the drawing. An exemplary embodiment of the connection according to the invention is explained in more detail below with reference to the drawing, in which:

FIG. 1 shows a view of a partially cut-away internal-turning head,

FIG. 2 shows a view of the internal-turning head, with the cutter holder having been omitted, FIG. 3 shows a view of the cutter holder, FIG. 4 shows a further view of the cutter holder, FIG. 5 shows a partial section through an internal-turning head having a variant of the cutter holder, FIG. 6 shows a view of an internal-turning head according to the invention, and FIG. 7 shows a view in accordance with FIG. 6, but with a cutter holder arranged offset by 180°.

DETAILED DESCRIPTION

FIG. 1 shows an internal-turning head 1 with a main body 2 on which a connection shank 3 is arranged. On the shank 3, the internal-turning head is releasably connected, in a manner known per se, to a work spindle of a machine tool (not shown here). A continuous bore 4, in which a tool carrier 5 is inserted and is radially adjustable by means of an adjustment screw 6, runs transversely to the axis of rotation A of the tool head. A suitable adjustment mechanism is known from Swiss Patent No. CH-A-641,706. The tool carrier 5 is locked against rotation in the bore 4 in a manner known per se.

A cutter holder 9, on which a throw-away cutting tip 15 is fastened by means of a clamp screw 19, is releasably fastened on the tool carrier 5 by means of a setscrew 10. The cutter holder 9, which is produced in one piece, has a continuous stepped bore 20, in which a setscrew 10, which is screwed into a threaded bore 14 in the tool carrier, is inserted. As FIGS. 3 and 4 show, a transverse groove 13, which is open on both sides and extends beyond the bore 14, is made in an internal side, bearing against the tool carrier 5, of the cutter holder 9. The side flanks 13a of the transverse groove 13 are arranged transversely to the adjustment direction of the tool carrier 5, in accordance with FIG. 4. A driving key 11, which is arranged on the end side of the tool carrier 5 and which extends essentially over the entire end side of the tool carrier 5, as clearly shown by FIG. 2, engages in this transverse groove 13. This key 11 likewise has obliquely running flanks 11a. This driving key 11 has a specified excess size with respect to the transverse groove 13, such that the driving key 11 and the tool carrier 9 are slightly elastically deformed in the region of the transverse groove 13 when the setscrew 10 is tightened. The excess size is set such that the forces required for the deformation can be applied using a hexagon socket screw key fitted to the setscrew 10. The elastic deformation preferably extends over the entire length of the transverse groove 13 or of the driving key 11. The driving key 11 thus engages over its entire length in a clamping manner in the transverse groove 13.

When the setscrew 10 is tightened, surfaces 9a of the cutter holder 9 are pressed against corresponding surfaces 5a of the tool carrier 5. Thus, when the setscrew 10 is tightened, the side flanks 13a and the surfaces 9a of the cutter holder are pressed against the flanks 11a and the surfaces 5a. The cutter holder 9 thus bears against the tool carrier 5 essentially over the entire cross-section thereof.

In order to obtain greater elastic deformability in the region of the conical transverse groove 13 of the cutter holder 9, the latter may have two or more load-relieving grooves 17 running parallel to the groove 13, in accordance with FIG. 5. As FIG. 5 shows, the screw head 10 may have a conical bearing surface 10a which bears against a corresponding conical countersinking of the cutter holder 9.

FIGS. 6 and 7 show the internal-turning head 1 with cutter holder 9 arranged offset by 180°. To offset the cutter holder 9, it is merely necessary to loosen the setscrew 10 and rotate the cutter holder 9 through 180°. After tightening the setscrew 10, the cutter holder 9 is rigidly connected to the tool carrier 5 in the same manner. In the arrangement in accordance with FIG. 7, a bore 18a may be relief-turned in a workpiece 18.

We claim:

1. Connection between a cutter holder (9) and a tool carrier (5) of an internal-turning head (1) with a fine-adjustment mechanism, having a setscrew (10) for releasably connecting the cutter holder (9) to the tool carrier (5), characterized in that the cutter holder (9) has a conical transverse groove (13) and the tool carrier (5) has a corresponding driving key (11) on its end side, and the driving key (11) has a specified excess size compared to the transverse groove (13), such that the tool carrier (5) and the cutter holder (9) undergo an elastic deformation when the setscrew (10) is tightened and such that the surfaces of the tool carrier (5) and the cutter holder (9) bear flat against one another laterally next to the transverse groove (13) and the driving key (11).

2. Connection according to claim 1, characterized by at least one load-relieving groove (17) in the cutter holder (9).

3. Connection according to claim 1, characterized in that the setscrew (7) engages through the cutter holder (9) approximately centrically with respect to the transverse groove (13).

4. Connection according to claim 1, characterized in that the setscrew (10) is screwed into the driving key (11), approximately centrically with respect to the driving key.

5. Connection according to claim 1, characterized in that the tool carrier (5), laterally next to the driving key (11), and the cutter holder (9), laterally next to the transverse groove (13), in each case have surfaces (9a, 5a) which lie in the same plane and bear flat against one another when the setscrew (10) is tightened.

6. Connection according to claim 1, characterized in that the conical transverse groove (13) extends essentially over the entire width of the cutter holder (9) and is open at the sides.

7. Connection according to claim 1, characterized in that the driving key (11) extends essentially over the complete width of the tool carrier (5).

8. Connection according to claim 1, characterized in that the setscrew (10) has a conical shoulder (10a) and the cutter holder (9) has a corresponding conical countersinking in a continuous bore (12).

* * * * *